United States Patent Office 3,842,032
Patented Oct. 15, 1974

3,842,032
METHOD OF COLORING UNSATURATED POLYESTER RESIN SHAPED ARTICLE
Katsuo Sato and Yoshio Imae, Hiratsuka, Japan, assignors to Mitsubishi Gas Chemical Company, Inc., Tokyo, Japan
No Drawing. Filed Sept. 7, 1972, Ser. No. 287,021
Claims priority, application Japan, Sept. 7, 1971, 46/68,490
Int. Cl. C08g 51/04
U.S. Cl. 260—40 R                7 Claims

ABSTRACT OF THE DISCLOSURE

A method of coloring an unsaturated polyester resin shaped article, which comprises coloring a low-shrinkage unsaturated polyester resin with a carbon black-polymer composition.

---

This invention relates to a novel method of coloring a shaped article of an unsaturated polyester resin.

Generally, unsaturated polyester resins are used as reinforced plastics by incorporation of glass fibers or a filler such as calcium carbonate or clay. In order to color such reinforced plastics, it is necessary to add a coloring agent before curing of the unsaturated polyester resin, and therefore, the coloring agent not only requires weatherability and thermal resistance, but also it should not inhibit the curing of the unsaturated polyester resin. Iron oxide pigments called iron black or carbon black has previously been used in general as a black coloring agent for the unsaturated polyester resins. Carbon black, however, has the serious defect that carbon black behaves as a free radical scavenger for polymerization and that carbon black is very difficult to disperse in the resin uniformly. Hence, carbon black is a very unsatisfactory black coloring agent for unsaturated polyester resins.

When an unsaturated polyester resin is cured, mold shrinkage occurs due to its polymerization and a reinforcing material such as glass fibers comes out onto the surface of the cured product thereby to fail to provide a smooth surface. Such a cured product is therefore unsuitable for use as various precision instrument parts. With a veiw to preventing the shrinkage, a method is known which involves blending a thermoplastic resin such as polystyrene, poly(methyl methacrylate) or finely divided polyethylene with the unsaturated polyester resin in an amount of 10–15% by weight based on the total amount of the resin to compensate the shrinkage of the unsaturated polyester resin with the swelling of the thermoplastic resin. The resulting blend is called a low-shrinkage unsaturated polyester resin.

Generally when the low-shrinkage unsaturated polyester resin is colored by a dye or pigment, the color developed is not uniform, and it is very difficult to obtain a uniformly colored product, and when iron black, for example, is used as a black pigment, the color tends to be gray or pastel shade and a product colored deep black cannot be obtained. Furthermore, when a dye is used, the color lacks resistance to weather, and fades or discolors after use for a long time.

Accordingly, it is an object of this invention to provide a method of obtaining an unsaturated polyester resin shaped article colored uniformly in deep black and having good weatherability, with the above-mentioned defects eliminated.

This object of the invention is achieved by a method of coloring a shaped article of an unsaturated polyester resin, using a carbon black-polymer composition as a black coloring agent.

The carbon black-polymer composition used in this invention is prepared by homopolymerizing or copolymerizing a vinyl monomer such as styrene or methyl methacrylate, which will form a polymer having good compatibility with an unsaturated polyester resin, by solution or bult polymerization in the presence of carbon black and a free radical initiator. By this operation, the active site of the surface of carbon black for free radicals disappears, and a part of the resulting polymer chain is chemically bound to the surface of the carbon black.

It should especially be noted that the term "carbon black-polymer composition," as used in the present specification and claims, means a reaction product formed between carbon black and the vinyl monomer, and a mere mixture of carbon black and the polymer is excluded. This carbon black-polymer composition is a known compound and a method of its production is disclosed, for example, in the specifications of U.S. Pats. Nos. 3,117,943 and 3,557,040. Since the polymer chain is bound to the surface of carbon black, carbon black is modified so that it is stably dispersed in an unsaturated polyester resin or cross-linking agent such as styrene, and it no longer shows a remarkable inhibiting effect in free radical initiated polymerizations. Accordingly, the use of such a carbon black-polymer composition as a coloring agent for an unsaturated polyester resin does not become detrimental to a curing reaction of the unsaturated polyester resin. This composition is dispersed easily and stably in the unsaturated polyester resin, and color non-uniformity does not take place at all during the curing of the unsaturated polyester resin. Furthermore, the carbon black-polymer composition, when added to the unsaturated polyester resin, has an effect of preventing the shrinkage of the resin during curing of the unsaturated polyester resin, and thus can reduce the amount of the thermoplastic resin to be added for providing a low-shrinkage unsaturated polyester resin. Sometimes, low-shrinage of the unsaturated polyester resin can be attained only by incorporating this carbon black-polymer composition.

The carbon black, which is used for producing carbon black-polymer composition of this invention may be any carbon black such as channel black, furnace black or acetylene black. Examples of the vinyl monomer to be reacted with carbon black are unsaturated carboxylic acids such as acrylic acid or methacrylic acid; esters of unsaturated carboxylic acids such as methyl acrylate, ethyl acrylate, butyl acrylate, methyl methacrylate, ethyl methacrylate, butyl methacrylate or lauryl methacrylate, and aromatic vinyl monomers such as styrene or chlorostyrene. These monomers are used either alone or in combination of two or more. Especially, styrene and methyl methacrylate are preferred.

The ratio of carbon black to the vinyl monomer used in the reaction may vary over a wide range. For example, carbon black may be used in a major proportion so that the carbon black-to-polymer ratio in the resulting carbon black-polymer composition will be 95:5. Usually, however, the preferred weight ratio of carbon black to the monomer is about 1:0.5–5.

A free radical polymerization initiator used in the preparation of the carbon black-polymer composition is usually preferably of the azonitrile type, and 2,2'-azobisisobutyronitrile is especially preferred. The polymerization reaction of carbon black with the vinyl monomer is carried out preferably by solution or bulk polymerization, and the polymerization can be completed by the consecutive addition of the polymerization initiator.

The term "unsaturated polyester resin" used in the present specification and claims denotes a polyester dispersion obtained by reacting an unsaturated polybasic acid such as maleic acid, maleic anhydride or fumaric acid, a saturated polybasic acid such as phthalic anhydride or isophthalic acid with a polyhydric alcohol such as ethylene glycol, diethylene glycol or propylene glycol, and adding a cross-linking agent such as styrene or methyl methacrylate. Shaped articles of the unsaturated polyester resin include those containing a filler, a releasing agent and glass fibers.

The colored polyester resin shaped article is produced in accordance with this invention by dispersing or dissolving the carbon black-polymer composition described above uniformly in a monomer such as styrene or methyl methacrylate or an unsaturated polyester resin, and mixing the dispersion with the unsaturated polyester resin in a suitable manner. The amount of the carbon black-polymer composition to be added depends upon the degree of blackness required, but generally, 5% by weight or less, calculated as the carbon black on the total resin in the shaped article, is sufficient.

The unsaturated polyester resin colored with this carbon black-polymer composition can usually be molded by compression molding, injection molding, transfer molding, etc. High shaping temperatures are generally desirable, and temperatures higher than 130° C. are preferred.

Generally, the shaping compounds are sheet molding compound (SMC), bulk molding compound (BMC), premix, etc.

The invention will be illustrated below by Examples.

Example 1

Synthesis of Carbon Black-Polymer Composition.—A mixture of 100 parts of oil furnace black with an average particle diameter of 50 m$\mu$. (amount of oil absorbed 150 cc./100 g., pH 7.5), 315 parts (by weight, the same hereinafter) of styrene, 200 parts of methyl isobutyl ketone and 0.5 part of 2,2'-azobisisobutyronitrile was placed in a reactor equipped with a stirrer, and the polymerization reaction is carried out at 80° C. in an atmosphere of nitrogen. In two hours, 1 part of 2,2'-azobisisobutyronitrile was further added, and the polymerization reaction was continued. Three hours later, 1.5 parts of 2,2'-azobisisobutyronitrile was further added, and the polymerization was continued for 5 hours. There was obtained a carbon black-polystyrene composition with a styrene conversion of 98.2%. The composition obtained was poured in an excess of methanol, and the solid matter was separated and dried. The solid matter obtained could be readily dispersed in a styrene monomer.

Example 2

Twenty parts of a dispersion of the carbon black-polystyrene composition in styrene (the weight ratio of the composition to styrene=3:2) obtained in Example 1 was added to 100 parts of an unsaturated polyester resin obtained from isophthalic acid, maleic anhydride, propylene glycol and styrene, the mole ratio of isophthalic acid to maleic anhydride being 1 to 3, the mole ratio of propylene glycol to total acid components being 1.05 to 1, and styrene being added in amount of 30% by weight based on the total resin. Then, 1 part of tertiary butyl perbenzoate and 5 parts of zinc stearate were added. The mixture was well dispersed, and the dispersion was transferred to a kneader, followed by thorough mixing with 220 parts of calcium carbonate (average particle diameter 1.15$\mu$, amount of oil absorbed 28 ml./100 g.). Then, 65 parts of ¼-inch chopped strand glass fibers were added, and kneaded with the mixture for 5 minutes. The resulting polyester premix was compression mold for 2 minutes at 150° C. and 120 kg./cm.$^2$ using a flat plate mold. The flat plate obtained was deep black without any color non-uniformity and the glass fibers did not come out onto the surface. The surface roughness of the flat plate was 155 microinches, and its Barcol hardness was 73.

The surface roughness was measured in accordance with the method disclosed in JIS B-0601, and the Barcol hardness was measured in accordance with ASTM D 2583 using a Barcol hardness tester of the GYZJ 934-1 type.

Comparative Example

Five parts of iron black, 1 part of tertiary butyl perbenzoate, 5 parts of zinc stearate, 220 parts of calcium carbonate and 65 parts of ¼-inch chopped strand glass fibers were added to 100 parts of a low-shrinkage unsaturated polyester resin (containing 10% of polymethyl methacrylate as a thermoplastic resin), and they were kneaded for 10 minutes. The resulting polyester premix was shaped under the same conditions as in Example 2. Glass fibers did not come out onto the surface of the shaped product, and the surface condition was good. But there was considerable non-uniformity of color to present a marble-like pattern, and the black portions were grayish and pastel shade.

Example 3

Twenty five parts of a dispersion of the carbon black-polystyrene composition in styrene (the weight ratio of composition to styrene=1:1) prepared in Example 1 was added to 90 parts of an unsaturated polyester resin obtained from isophthalic acid, maleic anhydride, propylene glycol, and styrene, the mole ratio of isophthalic acid to maleic anhydride being 1 to 2, the mole ratio of total acid components to propylene glycol being 1 to 1.06, and styrene being added in amount of 31% by weight based on the total resin.

Then, 1 part of tertiary butyl perbenzoate and 1.6 parts of an interior mold releasing agent (Zelec UN®; Du Pont) were added. They were well dispersed with stirring. To the resulting solution were added 100 parts of calcium carbonate, 5 parts of titanium oxide and 9 parts of a styrene dispersion of magnesium oxide (the weight ratio of MgO to styrene=1:2), and they were well mixed with a high-speed mixer. A sheet molding compound was prepared from this mixture and 1-inch choped strand glass fibers (90 parts), and press-formed for 2 minutes at 150° C. and 50 kg./cm.$^2$ using a flat plate mold. The flat plate obtained was deep black without any non-uniformity of color, and the surface roughness was 135 microinches.

Example 4

One part of tertiary butyl perbenzoate was added as a polymerization initiator to 100 parts of the same unsaturated polyester resin (containing 150 p.p.m. of hydroquinone as a polymerization inhibitor) as in Example 2. Using the resulting composition, the effect of the carbon black-polystyrene composition obtained in Example 1 on the curing reaction of this polyester composition was examined. The curing test was conducted in accordance with JIS K 6901 in an oil bath at 150°±1° C. The results are given in Table 1.

TABLE

| Additives | Amount added, parts | Curing cycle,* seconds | Maximum exothermic temperature, °C. | Barcol hardness |
|---|---|---|---|---|
| None | | 110 | 250 | 50 |
| Carbon black | 1.0 | 320 | 240 | 35 |
| Styrene solution of carbon black-polystyrene composition (1:1) | 4.0 | 155 | 247 | 43 |

*Time required from immersion in an oil bath at 150° C. until the maximum temperature of heat generated is attained.

The same procedure as above was repeated using 1 part of tertiary butyl per-2-ethylhexoate instead of the tertiary butyl perbenzoate. The results are shown in Table 2.

TABLE 2

| Additives | Amount added, parts | Curing cycle, seconds | Maximum exothermic temperature, °C | Barcol hardness |
|---|---|---|---|---|
| None | | 75 | 240 | 51 |
| Carbon black | 1.0 | 215 | 238 | 40 |
| Styrene solution of the carbon black-polystyrene composition (1:1) | 4.0 | 98 | 245 | 50 |

It is seen from the results obtained that the carbon black-polystyrene composition hardly affects the curing reaction of the unsaturated polyester resin, and has a far smaller polymerization inhibiting action than carbon black alone.

Example 5

18 parts of a styrene dispersion of a composition of carbon black and a styrene/methyl methacrylate copolymer (in a weight ratio of styrene/MMA=3:1); the weight ratio of carbon to the copolymer=1:3, (the weight ratio of the composition to styrene 1:1) produced under the same conditions as in Example 1 was added to 100 parts of an unsaturated polyester resin obtained from isophthalic acid, maleic anhydride, propylene glycol, and styrene, the mole ratio of phthalic anhydride to maleic anhydride being 1 to 4, total acid components to propylene glycol being 1 to 1.05, and styrene being added in amount of 30% by weight based on the total resin. Then 0.8 part of benzoyl peroxide and 4 parts of zinc stearate were added. These compounds were well dispersed with stirring, and further mixed with 40 parts of calcium carbonate to form a resin composition. The resulting resin composition was cast on a glass mat (2-ply) placed on a mold, and press-formed for 2 minutes at 140° C. and 45 kg./cm.² The surface condition of the shaped article was very good. The surface roughness was 160 microinches, and the resulting shaped product was deep black without color non-uniformity.

Example 6

Calcium carbonate (200 parts), 1 part of tertiary butyl perbenzoate, 5 parts of zinc stearate, 1 part of magnesium oxide and 85 parts of glass fibers were kneaded with 105 parts of a resin composition which consisted of 85 parts of a low-shrinkage unsaturated polyester resin composed of 68 parts of the same a highly reactive isophthalic type unsaturated polyester resin as in Example 2 and 17 parts of a 40% styrene solution of polystyrene (M-9 of Amoco Chemical Corp.) and 20 parts of a styrene dispersion (1:1) of the carbon black-polystyrene composition (weight ratio of the composition to styrene=1:1) produced in Example 1 to form a bulk molding compound. This BMC was molded at 150° C. and 110 kg./cm.² The resulting molded article was deep black without any non-uniformity of color. The surface roughness of the molded product was 140 microinches.

Example 7

20 parts of a 40% styrene solution of an acrylic thermoplastic resin (HE-6450, Du Pont) was added to 100 parts of an unsaturated polyester resin obtained from isophthalic acid, maleic anhydride, propylene glycol, neopentyl glycol, and styrene, a mole ratio of isophthalic acid to maleic anhydride being 1 to 3, propylene glycol to neopentyl glycol being 1 to 2, a mole ratio of total acid components to total polyol components being 1 to 1.05, and styrene being added in amount of 30% by weight based on total resin. Furthermore, 15 parts of a carbon black-methyl methacrylate/methacrylic acid copolymer as the styrene dispersion (the weight ratio of the methyl methacrylate to methacrylic acid=9:1, the weight ratio of the carbon black to the copolymer=1:1), 1 part of tertiary butyl perbenzoate, 3 parts of zinc stearate, 130 parts of calcium carbonate, 5 parts of a styrene dispersion of magnesium oxide (the weight ratio of MgO to styrene=1:2) and 90 parts of 1-inch chopped strand glass fibers were kneaded well with the mixture. The resulting SMC was press-formed at 150° C. and 50 kg./cm.² The molded product was free from color non-uniformity.

What is claimed is:

1. A method of coloring an unsaturated polyester resin shaped article, which comprises coloring a low-shrinkage unsaturated polyester resin with a carbon black-polymer composition produced by reacting carbon black with a vinyl monomer compatible with the unsaturated polyester resin in the presence of a free radical polymerization initiator.

2. The method of claim 1, wherein said monomer is selected from the group consisting of unsaturated carboxylic acids, unsaturated carboxylic acid esters and aromatic vinyl compounds.

3. The method of claim 2, wherein the vinyl monomer is styrene or methyl methacrylate.

4. The method of claim 2, wherein the weight ratio of carbon black to the vinyl monomer is 1:0.5–5.

5. The method of claim 1, wherein the amount of said carbon black-polymer composition is not more than 5% by weight, calculated as carbon black based on the total amount of the resin in the shaped article.

6. A method according to claim 1 wherein the initiator is 2,2'-azobisisobutyronitrile.

7. A shaped article comprising a low shrinkage unsaturated polyester resin colored with a carbon black-polymer composition produced by reacting carbon black with a vinyl monomer compatible with the unsaturated polyester resin in the presence of a free radical polymerization initiator.

References Cited

UNITED STATES PATENTS

| | | | |
|---|---|---|---|
| 3,701,748 | 10/1972 | Kroekel | 260—40 R |
| 3,471,439 | 10/1969 | Bixler et al. | 260—40 R X |
| 3,557,040 | 1/1971 | Takashira et al. | 260—32.8 R X |
| 3,519,594 | 7/1970 | Michaels | 260—34.2 X |
| 3,590,018 | 6/1971 | Gebura | 260—40 R |

MORRIS LIEBMAN, Primary Examiner

S. M. PERSON, Assistant Examiner

U.S. Cl. X.R.

260—862